United States Patent [19]

Rush

[11] Patent Number: 5,662,195
[45] Date of Patent: Sep. 2, 1997

[54] SHIFTER ASSEMBLY CONVERSION KIT

[76] Inventor: Larry Rush, 5301 Pinedale Cir., Rapid City, S. Dak. 57702

[21] Appl. No.: 497,433

[22] Filed: Jun. 30, 1995

[51] Int. Cl.[6] ................ B60K 41/22; B62K 23/06; B62K 23/08
[52] U.S. Cl. .............. 192/3.51; 29/401.1; 74/474; 74/501.6; 74/502.4; 74/502.6; 74/512; 180/230
[58] Field of Search ................ 29/401.1; 74/474, 74/501.6, 502.4, 502.6, 512; 180/230; 192/3.51

[56] References Cited

U.S. PATENT DOCUMENTS

| | | | |
|---|---|---|---|
| 1,110,249 | 9/1914 | Bailey . | |
| 2,094,163 | 9/1937 | Weber | 74/481 |
| 2,540,926 | 2/1951 | Zook | 74/474 |
| 2,600,767 | 6/1952 | Herrell | 192/3.5 |
| 2,617,505 | 11/1952 | Tatge | 192/3.5 |
| 4,741,222 | 5/1988 | Berndt | 74/481 |
| 5,299,652 | 4/1994 | Bevins | 180/219 |

*Primary Examiner*—Allan D. Herrmann
*Attorney, Agent, or Firm*—David G. Rosenbaum

[57] ABSTRACT

A gear shift conversion kit and method for converting a foot-operated shift mechanism and a hand-operated clutch mechanism on a motorcycle to a hand-operated shift mechanism and a foot-operated clutch mechanism. Novel components which are contained in the gear shift conversion kit include a foot pedal arm, a cable receiver adjustment block, and a shifter arm.

8 Claims, 6 Drawing Sheets

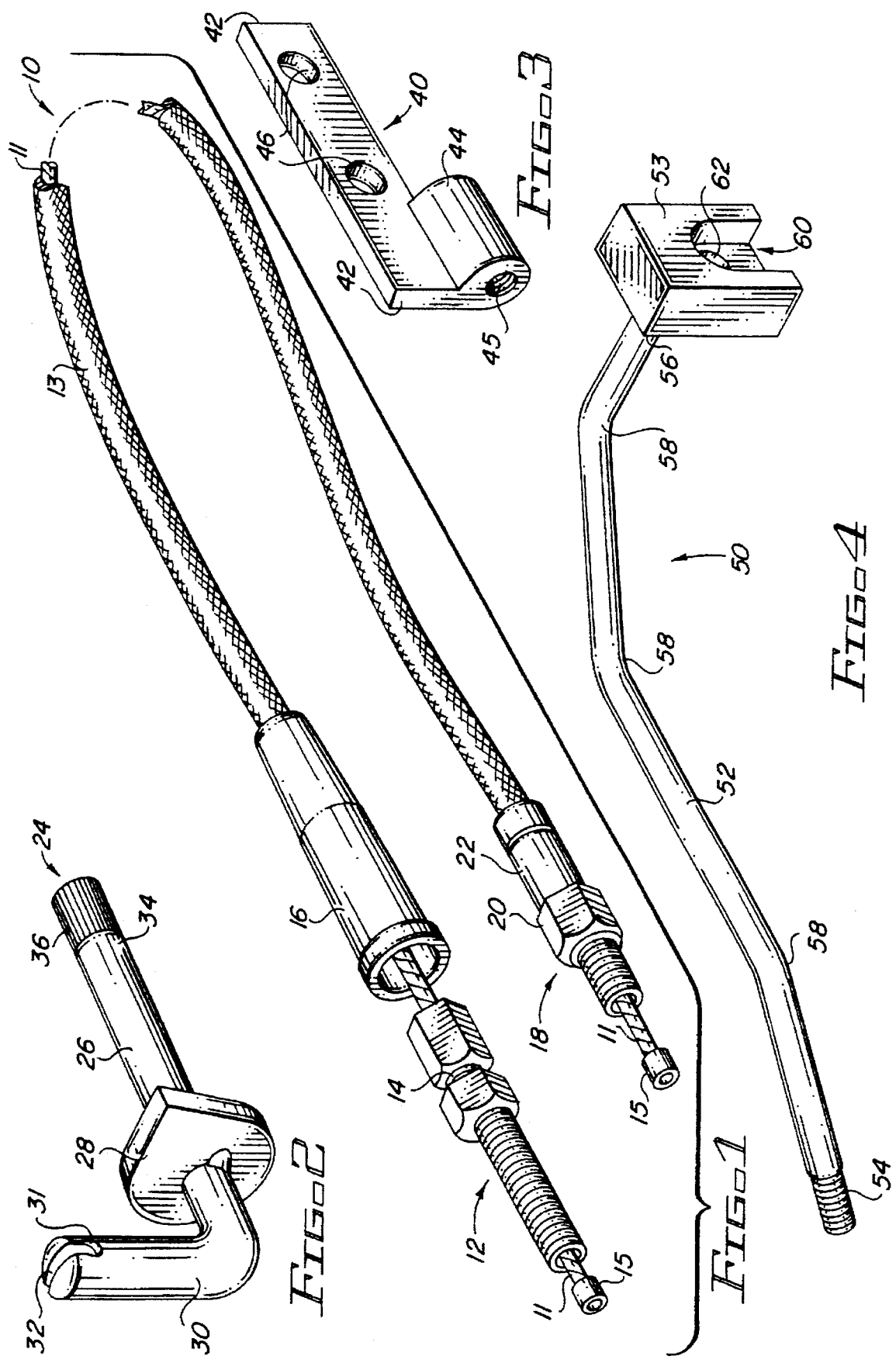

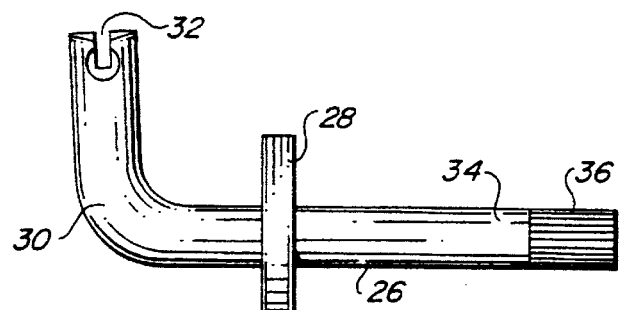
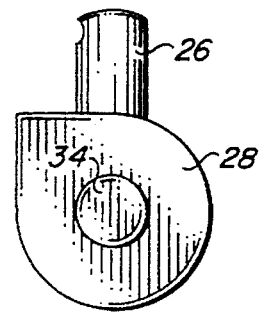
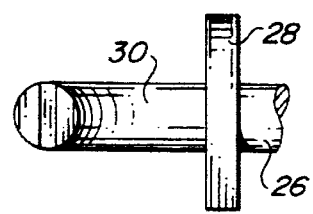
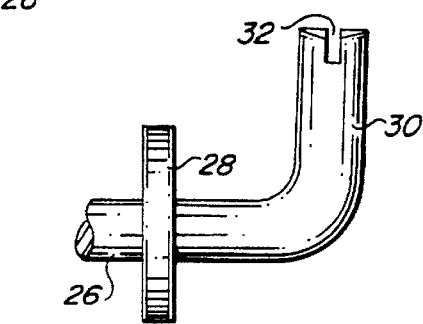
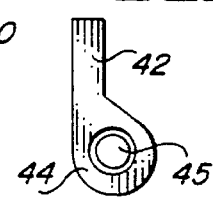
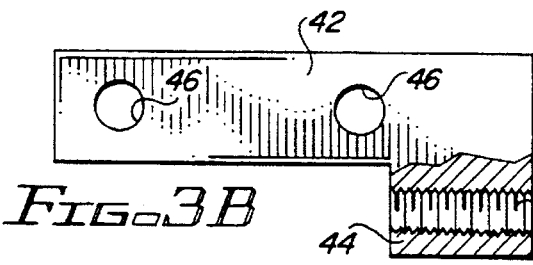
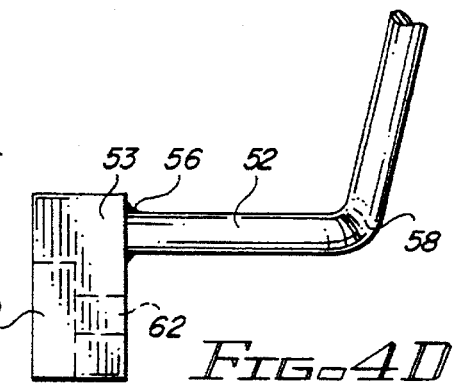
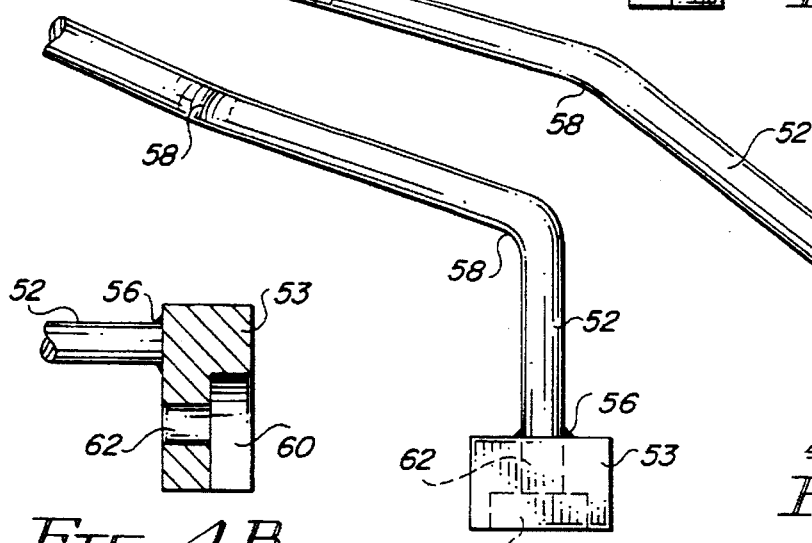
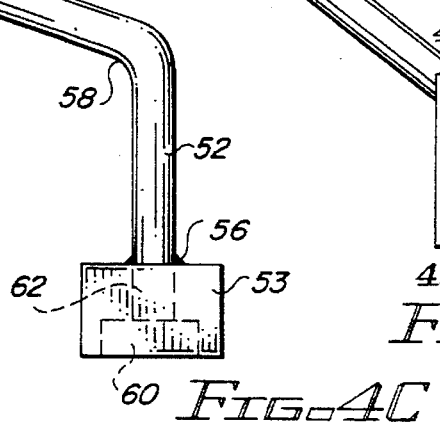

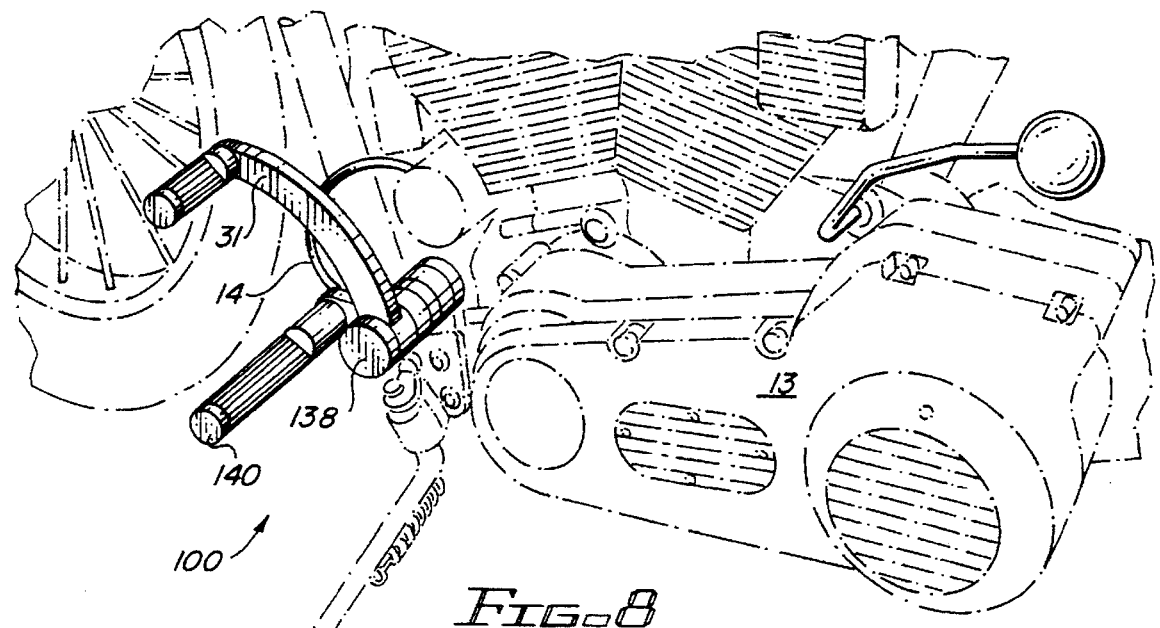
FIG.-8
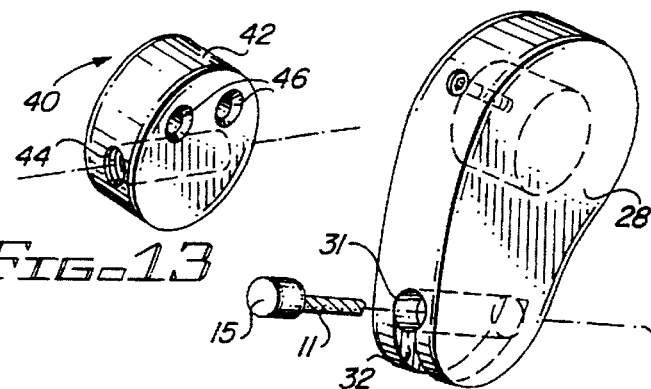
FIG.-13
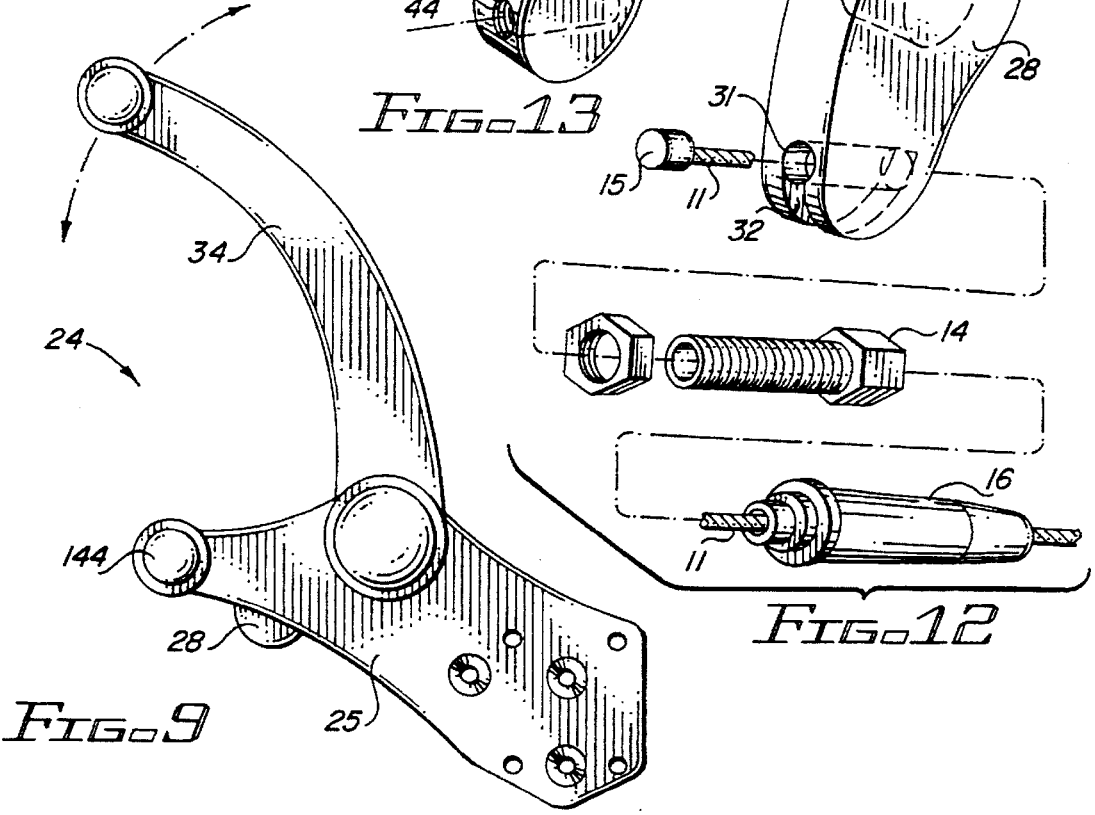
FIG.-12
FIG.-9

SHIFTER ASSEMBLY CONVERSION KIT

FIELD OF THE INVENTION

The present invention relates generally to a gear shift conversion kit. More particularly, the present invention relates to a gear shift conversion kit which converts the newer model Harley Davidson motorcycles, which require clutching with the hand and shifting with the foot, to older model versions which required shifting with the hand and clutching with the foot. The gear shift conversion kit can also be adapted to convert other motorcycles which require hand clutching and foot shifting to motorcycles which can be shifted with the hand and clutched with the foot. The present invention is also directed to the inventive component pieces contained in the kit which are required to complete the gear shift conversion.

DESCRIPTION OF THE PRIOR ART

The prior art in the field of the invention includes a number of various shifting devices and mechanisms. For example, U.S. Pat. No. 4,741,222 issued to Berndt describes a manual shifting device for motorized vehicles wherein the movement of the shift foot pedal is also accomplished by moving a shifting lever assembly. The shifting lever assembly comprises a single continuous rod having a first section which includes a threaded portion at one end and a first 80° elbow at the other end, a second section which includes the first 80° elbow at one end and a second 80° elbow at its other end, and a third section which includes the second 80° elbow at one end and a termination at its other end which may be provided with a shift handle.

U.S. Pat. No. 2,094,163 issued to Weber discloses a gear controlling means for a motorcycle which unites foot-operated and manual-operated controls by a link and lever mechanism. The manual-operated gear level located on the handlebar of the motorcycle is coupled to the foot control such that it is capable of indicating which speed has been selected by the foot-operated control. Like the previously described U.S. Pat. No. 4,741,222, this patent does not entirely convert the shifting assembly from foot-operated to hand-operated, but instead enables a user to shift a motorcycle using both foot-operated means and hand-operated means.

Another gear shift mechanism is described in U.S. Pat. No. 1,110,249 issued to Bailey. More specifically, U.S. Pat. No. 1,110,249 discloses a variable speed transmission mechanism for motorcycles which includes a lever located adjacent to the seat for effecting different transmissions. The lever coacts with the foot-operated mechanism for changing transmissions.

Further, U.S. Pat. No. 5,299,652 issued to Bevins describes a shifting system for a motorcycle where the shifting system controls are located on the handlebars. The shifting system includes a shift switch which comprises an upshift button and a downshift button. During operation, the throttle is advanced and lowered while the clutch lever is closed to disengage the clutch. The upshift button is then depressed to discharge a burst of air from a tank to an actuator and shift arm in order to advance one gear in the transmission. The downshift button is used in the same way to accomplish downshifting one gear. This gear shifting system was designed for physically challenged motorcycle riders.

Other patent references in the prior art such as U.S. Pat. No. 2,617,505, issued to Tatge, and U.S. Pat. No. 2,600,767, issued to Herrell, are specifically directed to providing gear shift mechanisms which are only operable by a foot pedal. Another reference, U.S. Pat. No. 2,540,926, issued to Zook, discloses a conversion unit for motorcycles which comprises a foot pedal which pivots between gear shift positions and a swingable arm which is attached to the pedal. The object of the invention is to provide a conversion unit, which is adaptable to any make of motorcycle, which alters the gear shifting mechanism to allow a rider to maintain his hands and feet in the positions they are normally in during operation of the motorcycle.

None of the previously described references discloses an apparatus or method for completely converting a foot-operated shifting assembly to a hand-shifting assembly and a hand-operated clutch to a foot-operated clutch. Currently, there is a desire by motorcycle owners, particularly the owners of Harley Davidson motorcycles, to convert their current model motorcycles to resemble the older model Harley Davidson motorcycles. Accordingly, there is a need for a conversion apparatus or system which allows motorcycle owners to alter their motorcycles so that they resemble earlier models which included hand-operated shifting mechanisms and foot-operated clutch mechanisms.

SUMMARY OF THE INVENTION

It is a principal object of the present invention to provide a shifter assembly conversion kit.

It is a further object of the present invention to provide a method and apparatus for converting motorcycles which require clutching with the hand and shifting with the foot to older model versions which require shifting with the hand and clutching with the foot.

It is still a further object of the present invention to provide a shifter assembly conversion kit for motorcycles which converts the shifter assembly to a hand-operated mechanism and the clutch assembly to a foot-operated mechanism wherein the conversion kit comprises specific inventive pieces which are used in conjunction with other standard motorcycle parts and pieces in order to perform the conversion.

The shifter assembly conversion kit for converting the shifter assembly of a motorcycle includes specific inventive parts, namely a cable receiver adjustment block, a foot pedal arm, and a shifter arm, which are used in conjunction with several non-inventive standard parts which include a fitted cable, a pedal, a shifter ball or handle, a mirror clamp, bolts, nuts, washers, lock washers, and tie wraps.

More specifically, the gear shift conversion kit for converting a foot-operated shift mechanism and a hand-operated clutch mechanism to a hand-operated shift mechanism and a foot-operated clutch mechanism includes:

- a cable having first and second ends, said cable capable of being installed in a transmission side cover;
- a cable receiver adjustment block capable of being connected to said first end of said cable;
- a foot pedal arm having a first end connectable to the second end of the cable and a second end capable of being installed through a back side of a standard shifter bracket and connectable to a shifter pedal arm; and
- a shifter connectable to a transmission linkage arm.

Further, the general method for converting a foot-operated shift mechanism and a hand-operated clutch mechanism on a motorcycle to a hand-operated shift mechanism and a foot-operated clutch mechanism comprises the steps of:

a) removing and dismantling any existing shift assembly, clutch assembly, and cable assembly associated therewith;

b) placing and securing a foot-operated clutch mechanism and cable assembly near an area where a shift pedal from the shift assembly was removed; and c) placing and securing a hand-operated shift mechanism near an existing transmission linkage arm on the motorcycle.

The objects and advantages of the invention will appear more fully from the following more detailed description of the drawings in conjunction with the accompanying drawings.

BRIEF DESCRIPTION OF THE DRAWINGS

FIG. 1 is a perspective view of a fitted cable which comprises part of the gear shift conversion kit of the present invention.

FIG. 2 is a perspective view of the foot pedal arm which comprises part of the gear shift conversion kit of the present invention.

FIG. 2A is a front elevational view of the foot pedal arm shown in FIG. 2 which comprises part of the gear shift conversion kit of the present invention.

FIG. 2B is a side elevational view of the foot pedal arm shown in FIG. 2 which comprises part of the gear shift conversion kit of the present invention.

FIG. 2C is a top elevational view of the foot pedal arm shown in FIG. 2 which comprises part of the gear shift conversion kit of the present invention.

FIG. 2D is a rear elevational view of the foot pedal arm shown in FIG. 2 which comprises part of the gear shift conversion kit of the present invention.

FIG. 3 is a perspective view of the cable receiver adjustment block which comprises part of the gear shift conversion kit of the present invention.

FIG. 3A is a side elevational view of the cable receiver adjustment block shown in FIG. 3 which comprises part of the gear shift conversion kit of the present invention.

FIG. 3B is a rear elevational view of the cable receiver adjustment block shown in FIG. 3 which comprises part of the gear shift conversion kit of the present invention.

FIG. 4 is a perspective view of the shifter arm which comprises part of the gear shift conversion kit of the present invention.

FIG. 4A is a side elevational view of the shifter arm shown in FIG. 4 which comprises part of the gear shift conversion kit of the present invention.

FIG. 4B is a cross sectional view of the block member of the shifter arm shown in FIG. 4 which comprises part of the gear shift conversion kit of the present invention.

FIG. 4C is a partial side elevational view of the shifter arm shown in FIG. 4 which comprises part of the gear shift conversion kit of the present invention.

FIG. 4D is a partial rear elevational view of the shifter arm shown in FIG. 4 which comprises part of the gear shift conversion kit of the present invention.

FIG. 8 is a perspective view of the inventive gear shift conversion kit shown in its attachment to a motorcycle illustrated in phantom.

FIG. 9 is a side elevational view of the foot pedal arm and mounting bracket assembly of the inventive gear shift conversion kit.

FIG. 12 is an exploded perspective view illustrating a cable and its attachment to a cable receiving cam of the foot pedal arm.

FIG. 13 is a perspective view of a cable adjustment block member of the foot pedal arm and mounting bracket assembly of the inventive gear shift conversion kit.

DETAILED DESCRIPTION OF THE PREFERRED EMBODIMENT

Figure 5:
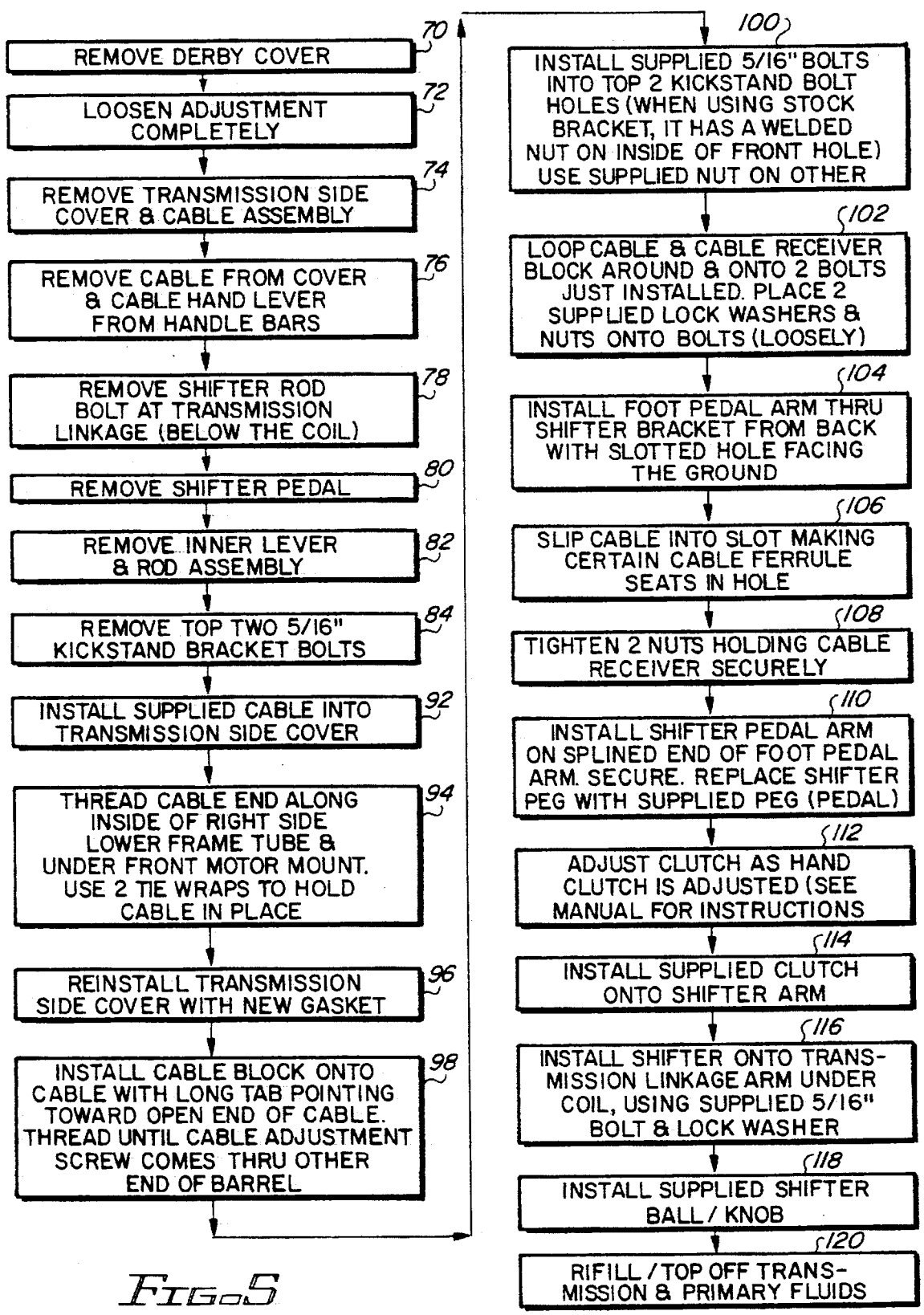
FIG. 5 is a flowchart showing the method steps required for carrying out the conversion of the shifter assembly using the gear shift conversion kit of the present invention.

The present invention provides a method and kit for converting a foot-operated shift mechanism and a hand-operated clutch mechanism to a hand-operated shift mechanism and a foot-operated clutch mechanism. Referring now to the figures, the critical components of the gear shift conversion kit are described first. FIGS. 1 and 12 show perspective views of a fitted cable 10 which comprises part of the gear shift conversion kit of the present invention. The fitted cable 10 comprises a cable 11 having a first end 12 which includes a nut assembly 14 and large sleeve 16 and a second end 18 which includes a second nut assembly 20 and smaller sleeve 22. The first end 12 of the fitted cable 10 is connected to the transmission side cover 13 of a motorcycle and the second end 18 of the fitted cable 10 is connected to a cable receiver adjustment block 40 (See FIG. 3) of the present invention.

FIG. 2 shows a perspective view of the foot pedal arm 24 of the gear shift conversion kit. The foot pedal arm 24 comprises a solid cylindrical member 26 and an annular cable receiving cam member 28 which is fitted over and secured onto the solid cylindrical member 26. The solid cylindrical member 26 further comprises an end member 30 having a slot 32 and a straight end 34 having a splined termination 36. FIG. 2A is a front elevational view of the foot pedal arm 24 of the gear shift conversion kit which shows the annular cable receiving cam member 28 positioned and secured midway between the end member 30 and the straight end 34. FIG. 2B is a side elevational view of the foot pedal arm 24 which clearly depicts the cam shape of the annular cable receiving cam member 28. However, it should be known that the present invention contemplates various shaped annular members including an annular member having one or more straightened sides. FIG. 2C shows a top elevational view of the foot pedal arm 24 and FIG. 2D shows a rear elevational view of the foot pedal arm 24.

The cable receiver adjustment block 40 of the gear shift conversion kit is illustrated in FIG. 3 and 13. The cable receiver adjustment block 40 comprises a rectangular member 42 and a shortened hollow cylindrical member 44 attached to a side of the rectangular member 42. Further, the rectangular member 42 includes a pair of openings 46 for positioning and securing the cable receiver adjustment block 40. FIG. 3A shows a side elevational view of the cable receiver adjustment block 40 which shows a portion of the exterior surface of the shortened hollow cylindrical member 44 being flush with a side and back edge of the rectangular member 42. However, any connection of the shortened hollow cylindrical member 44 along any side of the rectangular member 42 is contemplated by the present invention in that any such configuration would serve the same functional purpose in terms of carrying out the conversion contemplated by the gear shift conversion kit. FIG. 3B shows a rear elevational view of the cable receiver adjustment block 40 of the gear shift conversion kit with the shortened hollow cylindrical member 44 shown in cross-section. The hollow center 45 of the shortened hollow cylindrical member 44 is threaded to assist in connecting the cable receiver adjustment block 40 to the second end 18 of the fitted cable 10. FIG. 3B shows that the pair of openings 46 clearly extend through the entire thickness of the rectangular member 42.

FIG. 4 illustrates the shifter arm 50 of the gear shift conversion kit. The shifter arm 50 comprises an arm member 52 and a block member 53. The arm member 52 includes a first threaded end 54, an opposite second end 56 and a series of bends 58. The block member 53 includes a cut out portion 60 which contains an opening 62 which extends through the block member 53. The arm member 52 is positioned in a substantially ninety degree angle in relation to the block member 53 when the cut out portion 60 of the block member 53 is facing downward toward the ground. FIG. 4A shows a side elevational view of the shifter arm 50 which illustrates the connection point for the arm member 52 and the block member 53 in phantom. FIG. 4B is a cross-sectional view of the block member 53 of the shifter arm 52 which shows the continuity of the cut out portion 60 and the opening 62 of the cut out portion 60. FIG. 4C is a partial side elevational view of the shifter arm 50 and FIG. 4D is a partial rear elevational view of the shifter arm 50.

An alternate preferred embodiment of the inventive gear shift conversion kit 100 is shown in FIGS. 8–13. Gear shift conversion kit 100 also consists of a cable 11, a cable receiver adjustment block 40, shown in FIG. 13, a foot pedal arm 24 coupled to a foot pedal axle member 146, an annular cable receiving cam member 28 engaged about the foot pedal axle member 146, which corresponds to the straight end 34 of the foot pedal arm 24 described above. The foot pedal arm 24 and the annular cable receiving cam member 28 are cooperatively movable with one another. The cable 11 has a seat member 15 at both terminal ends of the cable 11, with one of the seat members 15 being engageable with a seating recess 31 adjacent a splined section 32 of the annular cable receiving cam member 28 with the cable 11 passing through the splined section 32. A second end of the cable 11 is coupled to the transmission clutch (not shown) associated with the motorcycle transmission. The cable 11 is housed within a cable sheathing 13 which permits reciprocal movement of the cable 11 therein.

The foot pedal arm 24, foot pedal axle member 146, annular cable receiving cam member 28, and cable receiver adjustment block 40 are preferably all assembled on a mounting bracket 25 which is mountable onto the motorcycle using the same mounting bolts as the motorcycle kickstand assembly 2 depicted in FIG. 8. A foot peg 144 may also be provided to act as a foot rest.

When mounted onto a motorcycle, the inventive gear shift conversion kit 100 has the cable 11 coupled at a first end thereof to the annular cable receiving cam member 28, with the cable 11 passing through and secured within the cable adjustment block member 40 through the threaded adjustment nut assembly 20 adjacent the first end of the cable 11. Adjustment of the nut assembly 20 relative to the cable adjustment block member 40 tensions the cable 11 so that movement of the foot pedal arm 24, rotates the foot pedal axle member 146 and the annular cable receiving cam member to impart movement of the cable 11 to actuate the transmission clutch (not shown).

The method for utilizing the gear shift conversion kit of the present invention in order to accomplish its intended conversion is depicted in the form of a flowchart shown in FIG. 5. This method for converting a foot-operated shift mechanism and a hand-operated clutch mechanism to a hand-operated shift mechanism and a foot-operated clutch mechanism is particularly suited for converting the newer model Harley Davidson motorcycles, namely 1987 to present Harley Davidson "softail" motorcycles using a stock shifter bracket, armor after market equivalent and five speed transmission where the cable comes directly out of the transmission side cover 13.

Steps one through eight involve the removal and dismantling of existing pieces and assemblies which comprise part of the motorcycle in order to prepare the motorcycle for installation of the gear shift conversion kit. Step one 70 involves removing the derby cover which is positioned over the transmission side cover 13 on the motorcycle. The adjustment is then completely loosened in Step two 72 and the transmission side cover 13 and cable assembly are removed in Step three 74. Step five 76 requires removing the cable from the transmission side cover and the cable hand lever from the handle bars. The shifter rod bolt located at the transmission linkage, and below the coil, is removed in Step five 78. Next, the shifter pedal is removed in Step six 80 and the inner lever and rod assembly are removed in Step seven 82. Finally, the top two 5/16 inch kickstand bracket bolts are removed in Step eight 84.

The next series of steps involve the utilization and installation of the gear shift conversion kit of the present invention. The gear shift conversion kit 90 includes the fitted cable 10, the cable receiver adjustment block 40, the foot pedal arm 24, the shifter arm 50, all of which are described above in detail; and a shifter ball, a pedal, a mirror clamp, bolts, nuts, washers, and lock washers for securing the parts, and tiewraps for securing the fitted cable 10.

The first end 16 of the fitted cable 10 which comprises part of the gear shift conversion kit 90 is installed into the transmission side cover of the motorcycle in Step nine 92. The second end 18 of the fitted cable 10 is threaded along the inside of the right side lower frame tube and under the front motor mount in Step ten 94. Black tie wraps are then used to hold the cable in place. The transmission side cover is then reinstalled with a new gasket in Step eleven 96. In Step twelve 98, the cable receiver adjustment block 40 is installed onto the second end 18 of the fitted cable 10 with the long tab pointing toward the end of the fitted cable 10 and is threaded until the cable adjustment screw comes through the other end of the shortened hollow cylindrical member 44.

Two 5/16 inch bolts are then installed into the top two kickstand bolt holes where the two 5/16 inch kickstand bracket bolts were removed and nuts are secured on the opposite sides in Step thirteen 100. Note that when using a stock bracket, it has a welded nut on the inside of the front hole. Therefore, the additional nuts contained in the kit are not required. Next, in Step fourteen 102, the cable and cable receiver adjustment block are looped around and positioned onto the two 5/16 inch bolts just installed. Lock washers and nuts are then loosely placed onto the bolts. The foot pedal arm 24 is installed through the back of the shifter bracket with the slotted hole facing the ground in Step fifteen 104. In Step sixteen 106, the cable is slipped into the slot such that the cable ferrule is seated in the hole. The two nuts holding the cable receiver adjustment block 40 are securely tightened in Step seventeen 108.

Next, the shifter pedal arm previously removed from the motorcycle is installed on the splined end 36 of the foot pedal arm 24 in Step eighteen 110. The connection is secured and the shifter peg is replaced with a pedal which comprises part of the kit. The clutch is adjusted as you would adjust a hand clutch in Step nineteen 112 and the supplied clutch is installed onto the shifter arm 50 in Step twenty 114. The block member 53 of the shifter arm 50 is then installed onto the transmission linkage arm under the coil in Step twenty-one 116 using the 5/16 inch bolt and lock washer supplied in the kit. Finally, a supplied knob is installed on the shifter arm 50 in Step twenty-two 118 and the transmission and primary fluids are refilled and topped off in Step twenty-three 120.

Figure 6:
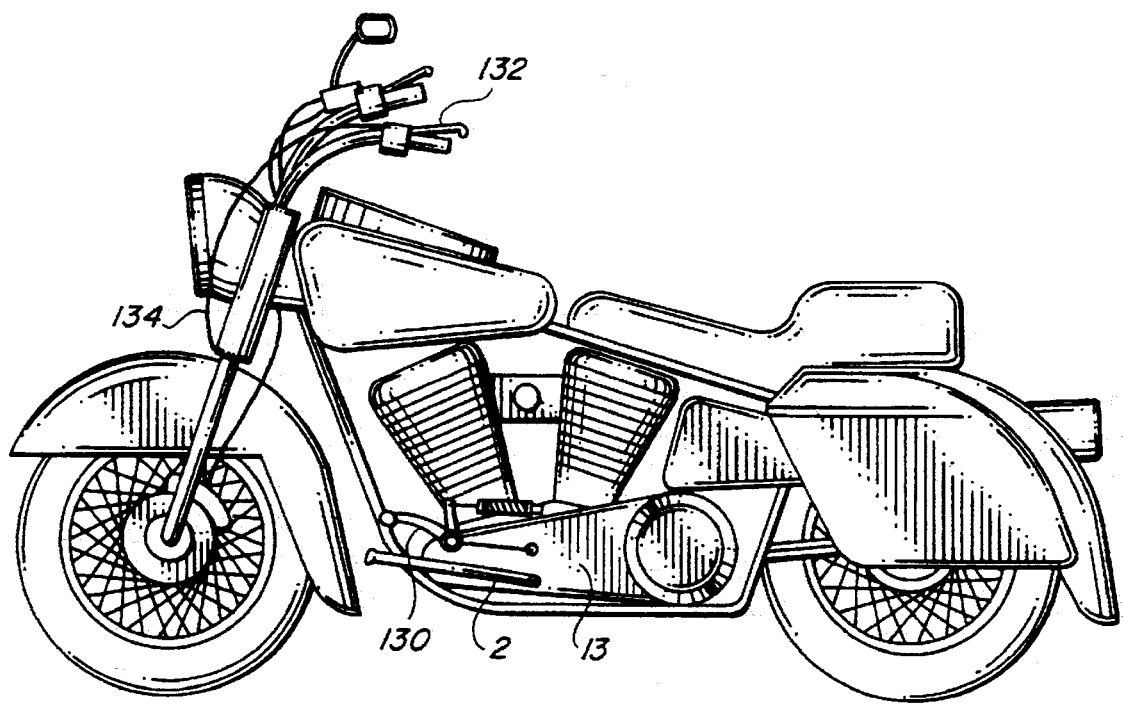
FIG. 6 is a right side plan view of a motorcycle having a foot-operated shift assembly and a hand-operated clutch assembly.
Figure 7:
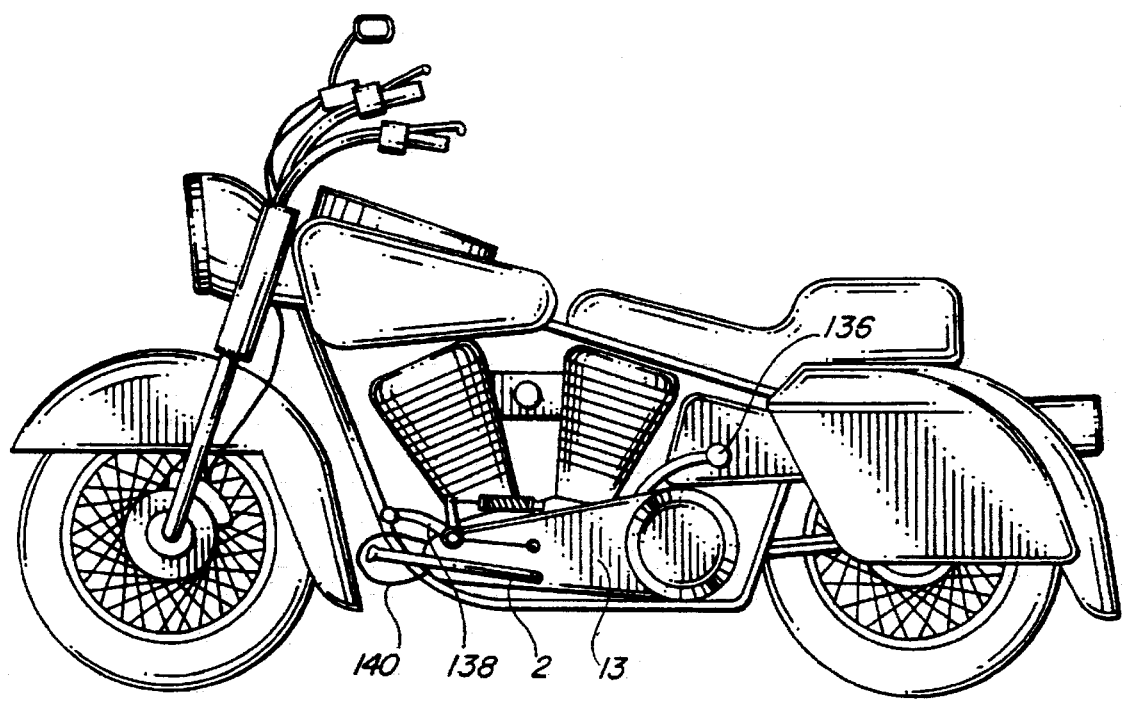
FIG. 7 is a right side plan view of a motorcycle after utilizing the gear shift conversion kit of the present invention to provide a hand-operated shift assembly and a foot-operated clutch assembly.
Figure 10:
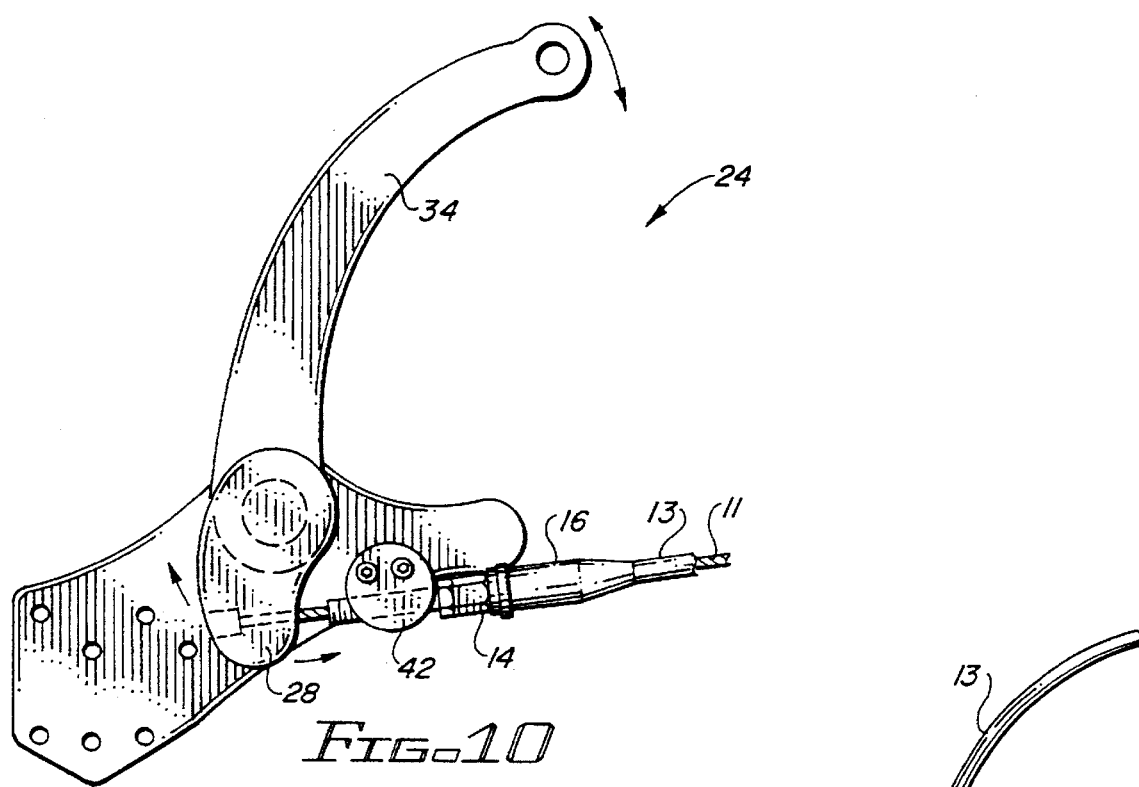
FIG. 10 is a side elevational view of the foot pedal arm and a cable receiver block having a cable attached thereto.
Figure 11:
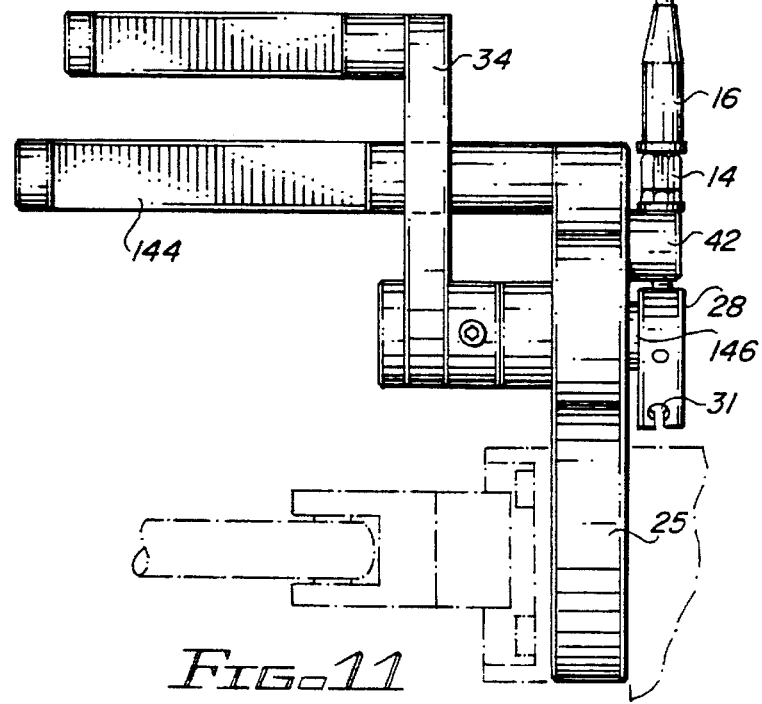
FIG. 11 is a top elevational view of FIG. 10 illustrating attachment of the mounting bracket assembly to a motorcycle mounting plate shown in phantom.

FIG. 6 shows a right side plan view of a motorcycle before utilizing the gear shift conversion kit. The motorcycle has a foot-operated shift assembly 130 and a hand-operated clutch assembly 132 which is connected by a cable 134 to the transmission side cover of the motorcycle. FIG. 7 shows a right side plan view of the motorcycle after utilizing and installing the gear shift conversion kit of the present invention. The post installation motorcycle has a hand-operated shift assembly 136 and a foot-operated clutch assembly 138 which is connected to a clutch cable 140.

While the preferred embodiment of the invention has been shown and described, it will be apparent to those skilled in the art that various modifications may be made in these embodiments without departing from the spirit of the present invention. Therefore, all suitable modifications and equivalents fall within the scope of the invention.

I claim:

1. A motorcycle gear shift conversion kit for converting a foot operated shift mechanism coupled to a motorcycle transmission and a hand-operated clutch mechanism connected to a motorcycle transmission clutch to a hand-operated shift mechanism connected to the motorcycle transmission and a foot-operated clutch mechanism connected to the motorcycle transmission clutch, comprising:

a foot-pedal assembly comprising a mounting bracket mountable onto portion of the motorcycle, a foot-pedal axle member coupled to and extending outwardly from the mounting bracket, a foot pedal member coupled to and pivotable about the foot-pedal axle member, a cable receiving cam member coupled to the foot-pedal axle member, and a cable adjustment block member coupled to the mounting bracket;

a cable member having first and second ends thereof, a first end of the cable member being engageable with the cable receiving cam member and a second end of the cable member being coupled to the motorcycle transmission clutch, whereby movement of the foot-pedal member tensions and causes the cable member to travel thereby actuating the motorcycle transmission clutch; and a hand-shifter member coupled to the motorcycle transmission.

2. The motorcycle gear shift conversion kit according to claim 1 wherein the cable member further comprises a cable housing concentrically disposed about the cable member and permitting the cable member to reciprocally move therein, and threaded adjustment members disposed at each of the first and second ends of the cable member and concentrically disposed about the cable member permitting the cable member to reciprocally pass therethrough, the threaded adjustment member at the first end of the cable member being coupled to the cable adjustment block member such that the cable member passes through the threaded adjustment member and the cable adjustment block member.

3. The motorcycle gear shift conversion kit according to claim 2, wherein the cable receiving cam member further comprises a splined section having a seating recess therein.

4. The motorcycle gear shift conversion kit according to claim 3, wherein the cable member further comprises a seat member provided at the first end of the cable member, the cable member being engageable in the splined section of the cable receiving cam member and the seat member being engageable within and fixedly retained by the seating recess of the cable receiving cam member.

5. The motorcycle gear shift conversion kit according to claim 1, further comprising a stationary foot peg member coupled to and projecting outwardly from the mounting bracket.

6. The motorcycle gear shift conversion kit according to claim 3 wherein the cable adjustment block member further comprises an internally threaded bore passing through the cable adjustment block member.

7. A method for converting a foot operated shift mechanism coupled to a motorcycle transmission and a hand-operated clutch mechanism connected to a motorcycle transmission clutch to a hand-operated shift mechanism connected to the motorcycle transmission and a foot-operated clutch mechanism connected to the motorcycle transmission clutch, comprising the steps of:

a) mounting a foot-pedal assembly onto a portion of the motorcycle, the foot-pedal assembly comprising mounting bracket, a foot-pedal axle member coupled to and extending from the mounting bracket, a foot pedal member coupled to and pivotable about the foot-pedal axle member, a cable receiving cam member coupled to the foot-pedal axle member, and a cable adjustment block member coupled to the mounting bracket;

b) connecting a first end of a cable member with the cable receiving cam member such that the cable member passes through the cable adjustment block member, connecting a second end of the cable member to the motorcycle transmission clutch and adjusting a tension of the cable member such that movement of the foot-pedal member tensions and causes the cable member to travel thereby actuating the motorcycle transmission clutch; and c) mounting a hand-shifter member onto the motorcycle and coupled to the motorcycle transmission.

8. The method of claim 4, further comprising the step of disassembling the hand-operated clutch mechanism and the foot-operated clutch mechanism on the motorcycle prior to performing step a).

\* \* \* \* \*